United States Patent [19]

Catallo et al.

[11] Patent Number: 5,280,811
[45] Date of Patent: Jan. 25, 1994

[54] METHOD OF SOFTLINING SEWER REHABILITATION

[76] Inventors: Guilio Catallo, 801 E. Nasa Rd. 1, Apt. 2010, Webster, Tex. 77598; Hermann Suerbaum, Longe Ackernstr. 14, 4938 Schieder-Schwalenberg, Fed. Rep. of Germany

[21] Appl. No.: 986,897

[22] Filed: Dec. 8, 1992

Related U.S. Application Data

[63] Continuation of Ser. No. 732,069, Jul. 18, 1991, abandoned.

[51] Int. Cl.$^5$ .................. F16L 55/162; F16L 55/18; B29C 63/36
[52] U.S. Cl. ......................... 138/98; 138/97; 156/294; 264/269
[58] Field of Search .............. 138/98, 97; 264/269, 264/267, 268, 512, 516; 156/287, 155, 294, 94; 405/150, 184; 426/35.4, 36.6; 29/402.09, 424

[56] References Cited

U.S. PATENT DOCUMENTS

| | | | |
|---|---|---|---|
| 3,132,062 | 5/1964 | Lang et al. | 156/287 |
| 3,511,734 | 5/1970 | Darrow | 156/287 |
| 4,009,063 | 2/1977 | Wood | 156/71 |
| 4,027,903 | 6/1977 | Hannover | 285/31 |
| 4,064,211 | 12/1977 | Wood | 264/95 |
| 4,752,431 | 6/1988 | Knowles | 156/294 |
| 4,770,562 | 9/1988 | Muller et al. | 405/154 |
| 4,956,038 | 9/1990 | Morinaga et al. | 156/287 |

FOREIGN PATENT DOCUMENTS

| | | | |
|---|---|---|---|
| 0208014 | 12/1983 | Japan | 156/294 |
| 0206623 | 10/1985 | Japan | 138/98 |
| 0005921 | 11/1988 | Japan | 156/294 |
| 0261979 | 10/1990 | Japan | . |
| 1039836 | 8/1966 | United Kingdom | . |

*Primary Examiner*—Harvey C. Hornsby
*Assistant Examiner*—Tony G. Soohoo
*Attorney, Agent, or Firm*—Arnold, White & Durkee

[57] ABSTRACT

The present invention provides a novel method for softlining rehabilitation of pipe conduits in which the lining hose comprises an inner layer of resin-absorbing material and an outer layer which is a disintegrable coating. The outer layer initially allows for soaking the resin-absorbing material with resin, but disintegrates during installation so that the resin can contact the interior surface of the pipe conduit and provide an improved rehabilitation method. The present invention further provides a novel lining hose for use in softlining rehabilitation.

8 Claims, 1 Drawing Sheet

METHOD OF SOFTLINING SEWER REHABILITATION

This application is a continuation of application Ser. No. 07/732,069, filed on Jul. 18, 1991, now abandoned.

BACKGROUND OF THE INVENTION

The present invention relates to a method of restoring or rehabilitating a pipe conduit. More particularly the method relates to softlining sewer rehabilitation.

Various methods of softlining a pipe conduit which is buried underground are known. Generally speaking, such methods involve the use of a flexible lining hose which is subsequently converted into a rigid liner by use of curable resins. The flexible lining hose (hence the term softlining) generally has a diameter which is slightly smaller than the inner diameter of the pipe conduit to be repaired. The lining hose frequently includes layers of resin-absorbing material and an essentially impermeable coating as the outermost layer. The resin-absorbing layer is soaked with an appropriate resin prior to introduction of the liner into the pipe conduit. The lining hose is introduced into the pipe conduit in a collapsed state and subsequently is shaped using a variety of means to conform the liner to the shape of the pipe conduit.

One method of this kind is shown in U.S. Pat. No. 4,009,063. This method employs a flexible lining hose with impermeable inner and outer layers of plastic with felt sandwiched between the plastic layers. In this method, bonding of the lining hose with the interior surface of the pipe conduit cannot take place due to the barrier created by the impermeable outermost layer of the lining hose. As a result leaky locations in the pipe conduit such as cracks, fissures, and damaged pipe connections are not sealed. This results in ground water penetrating into and collecting in the annular space between the liner and the pipe conduit. Further, securing the lining in the pipe conduit cannot be achieved in this construction because no bonding of the liner with the pipe conduit is possible. As a result the longevity of the rehabilitation is limited due to the corrosive effects of water in the annular spaces and the movement of the lining within the pipe conduit. Although a new liner has been installed, the pipe is not rehabilitated in effect because water continues to infiltrate. Another problem is encountered with this construction when the lateral lines which have been blocked off by the newly installed liner get reconnected. Because the installed liner is not secured, it may move in the axial direction while the cuts are being made or thereafter, and the reconnection lines cannot be adequately sealed at the joint. Leaky connections result and again the longevity of the liner is impaired.

Another softlining method is shown in U.S. Pat. No. 4,064,211 in which a lining hose is everted into the existing pipe conduit. In this method the lining hose is introduced into the interior of the pipe by turning one end region over and by causing the turned over region to gradually advance through the interior of the pipe conduit. During eversion the liner is turned inside-out so that the resin-soaked layer which was originally the inner layer of the lining hose is gradually turned to become the outermost layer of the lining hose. As it is everted, the liner is expanded by fluid which is used to turn the liner inside-out. Upon expansion of the reversed liner, the resin-soaked layer contacts and bonds the liner to the pipe conduit. Relatively high forces are needed to accomplish eversion of the resin-impregnated lining hose. Performing this eversion method frequently results in the formation of folds or creases in the lining hose which cannot be prevented. The shapes of folds and creases are stabilized when the resin cures or hardens. Such folds or creases adversely affect the flow-through cross-sectional area of the pipe; promote the formation of deposits in the new line; and prevent uniform contact of the lining hose to the wall of the existing pipe. When such folds or creases are formed, they must usually be removed by a milling apparatus or such similar techniques which result in increased costs.

Another softlining rehabilitation method is described in U.S. Pat. No. 4,770,562. In that patent the lining hose is comprised of an inner resin-absorbing layer and an impermeable outer layer which is perforated after impregnation with resin. In this method the plurality of flow through openings formed in the outer layer of the lining hose allow the resin to migrate from the inner layer to the pipe conduit surface, thereby bonding the liner to the wall of the existing pipe.

In performing these methods of softlining rehabilitation, it is desirable to have the resin fully impregnate the resin-absorbing layer of the lining hose. The resin-absorbing layer of the lining hose serves as a carrier for the resin which ultimately rigidifies and rehabilitates the pipe conduit. Impregnation is accomplished typically by evacuating air from the interstitial spaces of a resin-absorbing material such as felt. Evacuation of the air allows resin to fill the voids in the material. Various methods of performing impregnation using vacuum are known to those skilled in the art.

In performing vacuum impregnation generally, a vacuum pump is attached to one end of the lining hose or attached at various points along the lining hose. Upon creating a partial vacuum inside the lining hose, the resin is injected and pulled by the vacuum into the interstitial spaces of the resin-absorbing layer and down the length of the lining hose. To evacuate air from the resin-absorbing layer in any case, an outer layer of the lining hose must be essentially impermeable to fluids. Traditionally lining hoses have been constructed with an outermost layer or coating of plastic such as polyurethane, polyethylene, polyvinylchloride and other similar inert plastic materials. These plastics provide an essentially impermeable barrier on the outside of the lining hose and readily allow the creation of a partial vacuum inside the lining hose.

Although an essentially impermeable outer layer is needed to perform vacuum impregnation, it is not desirable to have an outer impermeable barrier against the existing pipe as shown in U.S. Pat. No. 4,009,063. If the outer impermeable layer of the lining hose lies directly against the pipe to create a barrier between the resin and the pipe conduit, the purpose of rehabilitation is somewhat defeated. If the resin is placed against the wall of the existing pipe using the eversion process shown in U.S. Pat. No. 4,064,211 other problems are encountered. The lining hose is traumatized during eversion because of the very high stresses needed to evert the resin-impregnated liner. Additionally, the lining hose is stretched and sometimes damaged due to the stresses encountered during eversion. Stretching of the liner leads to the formation of folds and creases and their associated problems discussed above.

The present invention provides a method for softlining rehabilitation in which a liner can be impregnated using vacuum and subsequently bonds to the pipe conduit without the disadvantages of the eversion methods. The present invention also provides a novel lining hose for use in softlining sewer rehabilitation.

SUMMARY OF THE INVENTION

The present invention provides a novel method of softlining pipe rehabilitation. The method comprises installing a lining hose having a resin-absorbing inner layer and a disintegrable outer coating; soaking the softlining hose with a resin; inserting the lining hose into the pipe conduit while initiating disintegration of the coating; shaping the lining to conformingly line the pipe conduit; and rigidifying the resin. The outer coating is generally a film-forming polymer that is capable of disintegrating and dissolving so that the resin is free to migrate from the resin-absorbing layer to the existing pipe surface. The present invention also provides a novel lining hose for use in softlining rehabilitation that comprises an inner layer of resin-absorbing material and an outer disintegrable coating.

The present invention provides a method in which both vacuum impregnation can be accomplished with a lining hose and the resin-absorbing layer of the lining hose contacts the pipe conduit without everting the lining hose. The novel lining hose constructed of an inner layer of resin-absorbing material and an outer surface of which is coated with a material that initially creates an essentially impermeable barrier, but subsequently dissolves or disintegrates so that the resin-absorbing layer contacts the pipe conduit upon completion of installation.

DETAILED DESCRIPTION OF PREFERRED EMBODIMENT

Figure 1:
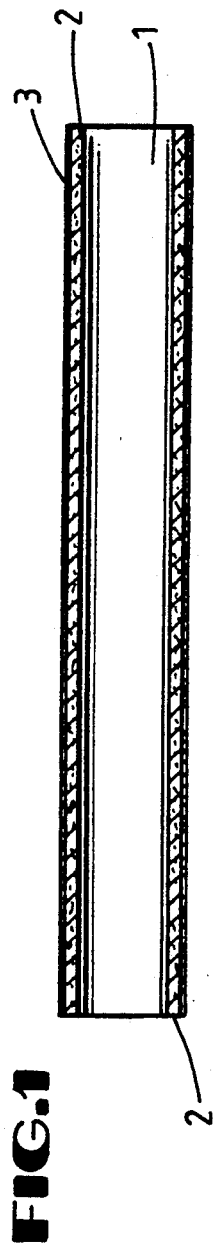
FIG. 1 illustrates a lining hose in accordance with the present invention.

The method of the present invention involves rehabilitating or restoring a pipe conduit buried underground which has a predetermined inner diameter, for example a sewer pipe.

In relining underground conduit, experience has shown that the best results are obtained if the conduit to be relined is first thoroughly cleaned. Pipe conduits which are in need of rehabilitation normally contain dirt, rocks and other debris that must be removed. The pipe conduit normally is cleaned and scrubbed with high pressure water to remove the debris and put the pipe in condition for rehabilitation. The conduit is then usually inspected by remote camera to determine the extent of damage to the pipe; however, inspection is not required to perform the method of this invention.

In the present invention a lining hose, which has an outer diameter that is slightly smaller than the inner diameter of the pipe conduit to be salvaged, is constructed. The inner component of the lining hose is constructed of resin-absorbing material. Various types of resin-absorbing materials, such as needled felt and reinforced felt, are suitable for the present invention. The thickness of the resin-absorbing material depends upon the diameter of the pipe to be rehabilitated and the desired strength of the end product. Diameters of the lining hose may range from about 6 inches (0.15 meters) to as large as about 96 inches (2.5 meters) depending upon the pipe to be rehabilitated. In general, the larger the existing pipe diameter, a greater thickness of resin-absorbing material is used. Multiple layers of resin-absorbing material may be used to achieve the desired thickness. Determination of the thickness of resin-absorbing material is well-known to those skilled in the art.

Prior to installation, the resin-absorbing material is soaked or impregnated with a curable resin. Thermosetting resins are normally used in carrying out such softlining pipe rehabilitations. Suitable resins for the purposes of the present invention are polyester resins; vinyl ester resins; acrylic resins; aminoplasts; polyvinyl halides; and epoxy resin. The present invention also contemplates the use of resin that may be cured by a variety of means including, but not limited to, light-cured resin materials. The preferred resins for the practice of this invention are polyester, epoxy, and vinylester resins.

In the practice of the present invention, it is desirable to fully impregnate the resin-absorbing layer of the lining hose with the selected resin. Impregnation is normally accomplished by evacuating air from the interstitial spaces of the felt-material which allows resin to fill the spaces and saturate the material. In most cases, the resin-absorbing material is impregnated to exceed saturation so that the excess resin can fill cracks and voids in the pipe to be salvaged. In order to evacuate air from the resin-absorbing layer, an outer layer of the resin-absorbing material must be sealed or made essentially impermeable. Various methods of performing impregnation using vacuum are known to those skilled in the art and any of such methods may be used to practice the present invention.

In accordance with the present invention, the lining hose (1) is constructed by forming a tube as shown in cross-section in FIG. 1. The resin-absorbing material (2) is surrounded by the disintegrable coating (3). One of the preferred resin-absorbing materials is a non-woven material for example, needled felt, however other materials such as fiberglass may be used. The resin-absorbing material is coated with the disintegrable material either prior to forming a tube or after the felt is made into a tube. The disintegrable coating can be applied to the felt in the form of either a film or by spraying the coating as a liquid which subsequently dries to form a film. When the disintegrable coating is a pre-formed film, the film is applied to the resin-absorbing material using appropriate adhesives. The disintegrable coating should be chemically resistant to the resin to be used.

In the preferred embodiment, the disintegrable coating is a film-forming polymer. Water soluble polymers are generally preferred as the disintegrable coating; however other types of disintegrable film-forming polymers may be used. One suitable film-forming polymer is polyvinyl alcohol (PVA) which can be formulated to achieve various rates of disintegration. PVA is readily water soluble and is commercially available as a film or in powder form. In accordance with the present invention, a PVA film or coating is applied to the resin-absorbing material.

The thickness of the disintegrable coating on the lining hose depends upon a number of factors including the rate at which disintegration of the coating is desired. The thickness of the disintegrable coating may range from about 0.001 mm to about 1.0 mm. For the preferred PVA coating, the coating thickness can be adjusted for very rapid or very slow disintegration. When the coating is on the order of 0.002 mm, PVA will begin to disintegrate within a few seconds upon contact with water and will totally dissolve in less than about 1 minute. When the coating is on the order of 0.05 mm, PVA will begin to disintegrate within about 30 seconds and will totally dissolve within a few minutes. The preferred thickness of the disintegrable coating for the present invention is in the range of about 0.05 to about 0.7 mm. Disintegration of the coating also depends upon temperature. Disintegration and dissolution are accelerated at high temperatures, i.e. above about 75° F. (24° C.). However, the preferred PVA coating will also disintegrate and dissolve at low temperatures e.g. 30° F. to 40° F. (about −1° C. to 4° C.) but at a slower rate.

Figure 2:
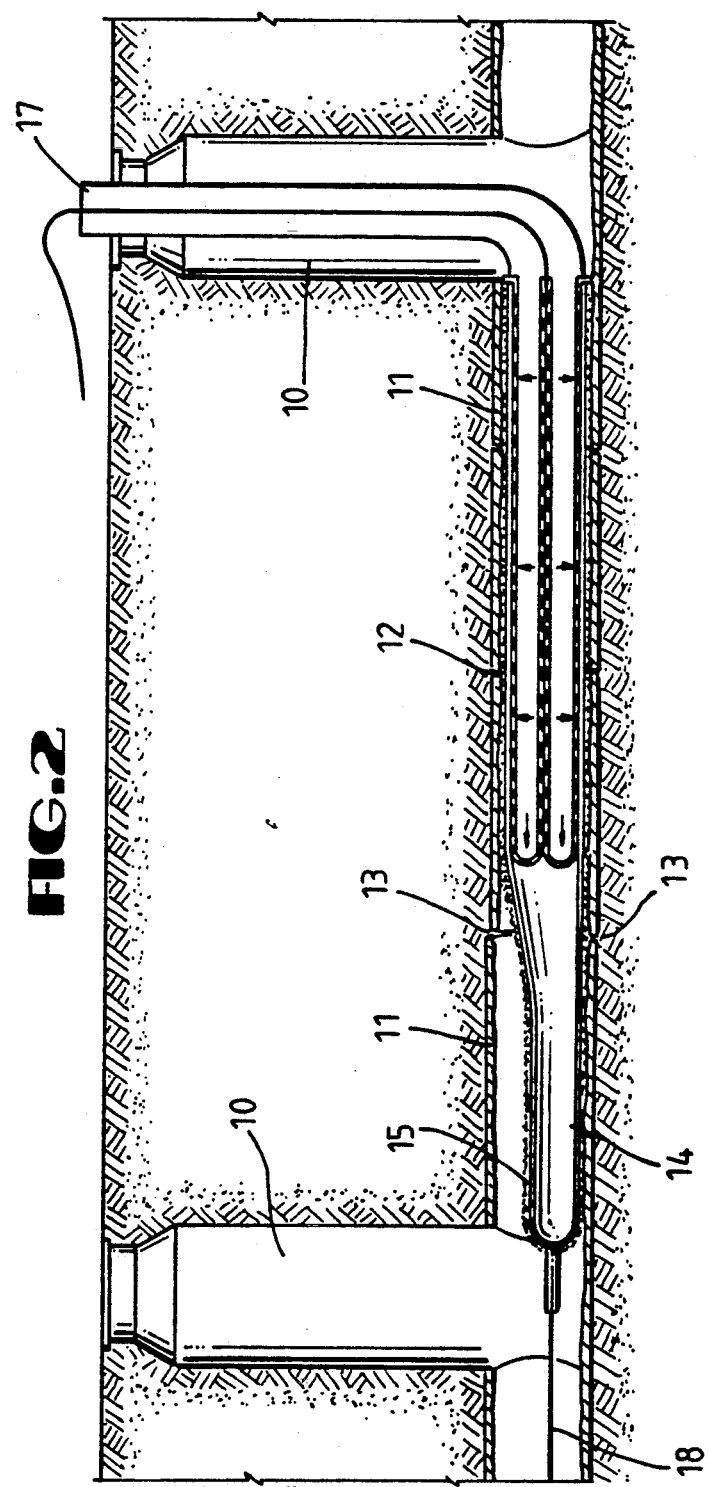
FIG. 2 illustrates an embodiment of the rehabilitation method of the present invention.

In performing one embodiment of the method of this invention, the lining hose having a resin-absorbing inner layer and disintegrable outer layer is impregnated with the selected resin using vacuum. Once the lining hose (14) is saturated with resin (15), it is installed in its collapsed state into the pipe to be rehabilitated (11) through a manhole (10) as shown in FIG. 2. The lining hose can be introduced into the pipe conduit using a variety of means (18). A preferred means for the present invention (as shown in FIG. 2) is to pull the lining hose into place using a rope or cable and a winch.

As the lining hose is introduced into the existing pipe, disintegration of the outer coating is initiated. In the preferred embodiment using PVA, disintegration is initiated by contacting the outer coating with water. The outer coating preferably remains intact while the lining hose is being fed through the manhole to the pipe conduit. One of the functions of the outer coating of the lining hose is to confine the resin after impregnation so that the lining hose can be handled and transported to the job site. When the lining hose is pulled in the pipe conduit, it may contact water from several sources—residual water from prior cleaning of the pipe, ground water seepage, or water from lateral connections. The water initiates disintegration of the outer coating of the liner. Disintegration of the outer coating may also be initiated by passing the lining hose through a water bath as it is introduced into the manhole.

Once the collapsed lining hose is pulled into position in the pipe, the film-forming polymer continues to disintegrate and a calibration hose (16) is partially received within the lining hose with a turned over region. The calibration hose (16) may be constructed of a plastic material, such as polyvinyl chloride and the like, or a laminated material of plastic and resin-absorbing material. The calibration hose (16) is sized to a diameter slightly smaller than the existing pipe. While the calibration hose is being fitted in the lining hose, the outer coating of the lining hose continues to disintegrate and dissolve. As the coating disintegrates, the resin (15) in the resin-absorbing material is free to contact the existing pipe surface (11). Moreover, the resin is able to migrate into cracks and fissures (12) of the deteriorated existing pipe as the lining hose is expanded. Additionally, the resin fills voids (13) which are created when the pipe joints become offset. As a result, the lining hose is tightly secured to the existing pipe conduit. Advantages of this secure fit are that (1) ground water is prevented from entering or infiltrating to the newly rehabilitated pipe (2) exfiltration of sewage is prevented; and (3) the longevity of the rehabilitation is greatly improved.

After the calibration hose (16) is fitted, fluid is pumped through a connection means (17) and into the calibration hose to evert it inside the lining hose. Pressure which is exerted on the calibration hose is transferred to the lining hose which causes the lining hose to expand and be shaped to conformingly line the pipe conduit. After the calibration hose expands to the entire length of lining hose, the resin is rigidified or cured. When using the preferred curable resins, hot water is circulated through the pipe to hold the lining hose against the pipe and to cure the resin. In curing, the reaction of the resin generates additional heat or exotherms. In using conventional thermosetting resins, the temperature of the lining hose may reach 175° F. (80° C.). Heat which is generated by the curing process accelerates disintegration of the outer coating, so that by the time the resin rigidifies, the outer coating of the lining hose is completely disintegrated. The PVA coating of the preferred embodiment will completely disintegrate in the range of about 120° F. to 140° F. (49° C. to 60° C.).

In an alternative embodiment, the calibration hose may be everted inside the lining hose using air pressure. The air pressure causes the calibration hose and lining hose to expand, conformingly line the existing pipe, and will maintain the lining hose in contact with the existing pipe. While maintaining the lining hose in the expanded condition, various means for curing the resin may be used. For example when using light-cured resins, an apparatus with a light source may be passed through the newly installed liner, which is held in place by the air pressure, until cure of the resin is effected.

Variations on the above described method of installation are well-known to those skilled in the art and are also contemplated for use with the novel lining hose of this invention.

What is claimed is:

1. A method for rehabilitating a pipe conduit comprising the steps of:
    a) soaking a lining hose with a resin; said lining hose comprising an inner layer of resin-absorbing material and an outer layer of a resin-resistant dissolvable coating;
    b) installing said lining hose into said pipe conduit while initiating dissolution of said outer layer;
    c) continuing dissolution of said outer layer while in said pipe conduit;
    d) expanding said inner layer to conform said inner layer to the shape of and into contact with said pipe conduit;
    e) maintaining said inner layer as expanded until said resin becomes rigid and secured to said pipe conduit.

2. The method of claim 1 wherein said dissolvable coating is a film-forming polymer.

3. The method of claim 2 wherein said resin is a thermosetting resin.

4. The method of claim 1 wherein said lining hose comprises an inner layer of felt and an outer layer of polyvinyl alcohol.

5. A method for rehabilitating a pipe conduit comprising the steps of:
    a) soaking a lining hose with a resin; said lining hose comprising an inner layer of resin-absorbing material and an outer layer of a resin-resistant film-forming polymer;
    b) installing said lining hose in said pipe conduit while dissolving said outer layer of film-forming polymer;

c) expanding said inner layer to conform said inner layer to and into contact with said pipe conduit; and d) maintaining said inner layer as expanded until said resin becomes rigid and secured to said pipe conduit.

6. The method of claim 5 wherein said film-forming polymer is a water soluble polymer.

7. The method of claim 5 wherein said lining hose comprises an inner layer of felt and an outer layer of polyvinyl alcohol.

8. The method of claim 5 wherein said resin is a thermosetting resin.

* * * * *